United States Patent [19]

Salac

[11] Patent Number: 4,767,440
[45] Date of Patent: Aug. 30, 1988

[54] POTTING MEDIA

[75] Inventor: Sotero S. Salac, Lincoln, Nebr.

[73] Assignee: The Board of Regents of the University of Nebraska, Lincoln, Nebr.

[21] Appl. No.: 680,148

[22] Filed: Dec. 10, 1984

Related U.S. Application Data

[60] Continuation-in-part of Ser. No. 251,381, Apr. 6, 1981, abandoned, which is a division of Ser. No. 46,783, Jun. 11, 1979, abandoned.

[51] Int. Cl.$^4$ ............................................. C05F 11/00
[52] U.S. Cl. ........................................... 71/23; 71/24; 71/64.13; 71/9; 71/21; 47/9
[58] Field of Search ........................................ 71/7–9, 71/21, 22, 23, 24, 64.13; 47/1 A, 9, 17, 56, 57, DIG. 4, 6, 9

[56] References Cited

U.S. PATENT DOCUMENTS 4,067,716  1/1978  Sterrett .................................... 71/24
4,135,907  1/1979  Houser et al. ....................... 71/23 X

FOREIGN PATENT DOCUMENTS 51-57554  5/1976  Japan ...................................... 71/23

Primary Examiner—Ferris H. Lander
Attorney, Agent, or Firm—Vincent L. Carney

[57] ABSTRACT

To prepare an effective potting media from waste plant products, a mixture of high carbon and high nitrogen organic material is mixed with a phosphoric acid solution to maintain a pH of between 5.5 and 7.1 under aerobic conditions, with or without soil. Ground wheat straw or other high carbon plant materials and ground alfalfa hay or other high nitrogen plant materials are used in the preferred embodiment in ratios of between three parts ground wheat straw or other high carbon plant materials for each seven parts of ground alfalfa hay or other high nitrogen plant materials to seven parts ground wheat straw or other high carbon plant materials for each three parts ground alfalfa hay or other high nitrogen plant materials. The mixture of wheat straw and alfalfa hay has a pH in the range of 7.0 to 8.1. Phosphoric acid 0.04 M is added periodically for approximately one month if the pH of the mixture is higher than desirable for the plant type. The potting media both with and without soil and with and without the addition of fertilizer show unexpectedly good results on plant life which are superior than peat moss or other types of potting media.

11 Claims, No Drawings

POTTING MEDIA

RELATED APPLICATIONS

This application is a continuation-in-part of U.S. patent application Ser. No. 251,381, filed on Apr. 6, 1981, which is a division of U.S. application Ser. No. 046,783, filed on June 11, 1979, both now abandoned, for POTTING MEDIA in the name of Sotero S. Salac and assigned to the same assignee as this application.

BACKGROUND OF THE INVENTION

This invention relates to container fertilizers.

In one class of container fertilizer, naturally occurring organic materials such as peat moss or wood are used either by themselves or mixed with soil or inert potting media such as sand or vermiculite.

In the prior art container fertilizers, the ratio of carbon to nitrogen in the plants has been high such as in a range from 20 to 1 to 180 to 1. It is known to combine inorganic nitrogen sources of fertilizer with plant material to improve the carbon to nitrogen ratio to a range of between 20 to 1 and 30 to 1, such as disclosed by Shimizu in Japanese Pat. No. 5157554. Hardwood bark waste paper pulp and organic vegetable matter combined with inorganic nitrogen sources of fertilizer have been published and have shown beneficial results in U.S. Pat. No. 4,067,716 to Sterrett and Japanese Pat. No. 5157554 to Shimizu.

Several prior art patents disclose compositions containing high protein and/or high carbon plant material but not in the required proportions or in a way having the beneficial results of this invention, such as: (1) the patent to Sherwin et al, U.S. Pat. No. 3,940,257, teaches the use of a soil conditioning composition formed from one part seaweed by weight to 10 parts tree bark as determined by the thickness of the mixture to be applied; (2) the patent to Klein, U.S. Pat. No. 2,750,269, discloses a fertilizer which includes a mixture of alfalfa straw with animal waste to form a compost; (3) the patent to Clapp, U.S. Pat. No. 1,078,716, discloses a composition of cellulose fiber with sawdust or other absorbent material such as moss for germinating seeds; and (4) the publication, "Soil," by Rogers et al, 1957 Yearbook of Agriculture, USDA, Washington, D.C., discloses the plowing under of crops for improving the soil and preventing or reducing erosion.

The use of peat moss has several disadvantages, such as: (1) peat moss is becoming expensive and higher grade peat moss is becoming difficult to find; and (2) some peat moss contains salt in quantities detrimental to some plants. The use of hardwood bark together with inorganic nitrogen has a disadvantage in that it is expensive and limited in use because the inorganic nitrogen is washed through the soil rather quickly.

Moreover, it has been found that plants grown in potting mixtures having a high carbon content such as those containing only wheat straw or with high a nitrogen content such as those containing only alfalfa hay exhibit subnormal growth response. For example, plants which are planted in a mixture containing 100% alfalfa hay either die or are stunted, with the leaves remaining dark green with slightly diminished glossiness and turgidity. Very few survive beyond five days.

Similarly, plants grown in potting mixtures containing 70% to 100% wheat straw are stunted and exhibit moderate to severe leaf chlorosis. There also appears to be accelerated tissue maturation with leaf abscission occurring earlier. The use of mixtures with the wrong proportions of nitrogen and carbon may stunt growth. Inorganic nitrogen fertilizer is washed prematurely from the mix and seaweed or animal waste tend to prevent adequate drainage.

SUMMARY OF THE INVENTION

Accordingly, it is an object of the invention to provide a novel potting media.

It is a further object of the invention to provide a novel media for the growing of horticultural plants.

It is a still further object of the invention to provide a process for growing plants which is economical and yields superior plant life.

Broadly, in accordance with a feature of the invention, high carbon plant material such as wheat straw is mixed with high nitrogen plant material such as alfalfa hay. Since the mixture may be more basic than generally desired, an acidic substance may be added to adjust the pH to the desired level. This substance is nontoxic to the plant and has the characteristic of remaining in the potting mixture and not leaching out during watering. For some acid loving plants, a higher concentration of the acidic substance may be added to the mixture.

The mixture may be used together with soil or without soil to grow horticultural plants. Fertilizer may be added although it is not necessary to obtain the beneficial results. The potting media is further characterized in that it allows drainage sufficient to prevent rotting of the plant and still retain moisture necessary for growth. Composting the mixture for two weeks and then storing it dry until use is beneficial and reduces initial odors. Soil may be mixed to retain moisture but should not be added in such quantity to prevent drainage of water from the mix.

It has been found that plants grown in potting mixtures having high carbon contents such as those containing only wheat straw or with high nitrogen contents such as those containing only alfalfa hay exhibit subnormal growth response. For example, plants which are planted in a mixture containing 100% alfalfa hay either die or are stunted, with the leaves remaining dark green with slightly diminished glossiness and turgidity. Very few survive beyond five days.

Similarly, plants grown in potting mixtures containing 70 to 100% wheat straw are stunted and exhibit moderate to severe leaf chlorosis. There also appears to be accelerated tissue maturation with leaf abscission occurring earlier.

Surprisingly, when proper mixtures of the high carbon and high nitrogen plant materials form the potting media, superior growth characteristics were obtained. As the mixtures are varied on either side, the performance decreases to the level of potting media such as peat moss until under the extremely one-sided mixtures mentioned above, the growth and appearance of the plants are adversely affected.

The decomposition of the two materials provides an unexpectedly beneficial effect for the growing of the plants. The advantage of the mixture in such proportions is that the high nitrogen material during its decomposition provides nitrogen for the growth of the microorganisms that break down the high carbon material as well as sufficient nitrogen for the plants. Later the decomposition of the microbial cells continues to supply nitrogen to the plants. When other types of potting media, such as peat moss, are used supplemental fertilization is required during the first 40 to 60 days of growth for most plants to supply sufficient nitrogen. However, when mixtures of high carbon and high nitrogen plants, such as the potting media, are used this fertilization, although beneficial, may not be necessary.

By high nitrogen, it is meant that the plant contains more than 1.5% and preferably more than 2% nitrogen when analyzed. By high carbon, it is meant that the plant contains nitrogen in such small amounts that microbes during decomposition of the dead plant material retain substantially all of the nitrogen. These plants generally have less than 1.5% nitrogen and form sugars upon decomposition.

It has been found that the decomposition of the plant materials under anaerobic conditions without proper drainage or aeration results in an increase in pH that is detrimental. Consequently, to enable ease of use particularly by inexperienced persons, a substance is added to maintain the pH between 5.5 and 7.1. Mixed plant material, cut and milled to an appropriate size, may be combined with such material and prepackaged for later use.

DETAILED DESCRIPTION

Generally, the plant material is pulverized and mixed in the desired proportions such as by hammermilling it using screen sizes such as 3/16 of an inch, ¼ of an inch or ⅜ of an inch. In some applications, it is mixed with topsoil, sand, vermiculite, perlite or combinations of these materials.

The pH of the potting mixture is then determined. The desired pH of the plant selected to be grown in the mixture is also determined. The pH of the potting media is adjusted by the addition of a nontoxic acidic material, which in the preferred embodiment is phosphoric acid. The acidic material is added periodically to the plant until the potting mixture has stabilized and the desired pH attained. Other acid or buffer materials may be used such as pine bark or dilute sulfuric acid instead of phosphoric acid.

Drainage should be sufficient to prevent rotting of the plant's roots but still retain sufficient moisture for plant growth. It has been found that plants growing in mixtures such as peat moss suffer from insufficient drainage. The potting mixture provides improved drainage while still retaining sufficient moisture. Soil may be added to increase moisture retention but substances such as clay should be avoided.

Generally, the potting mixture is intended for growing plants in containers, such as those used in greenhouses. Of course, the mixtures may be used as growth media for plants in other applications. It can also be composted and packaged for commercial sale. Fertilizer may be added with beneficial effects. However, because the growth of plants in the potting media without fertilizer is substantially improved over growth in peat moss, the results of adding fertilizer will be less dramatic.

Although alfalfa hay and wheat straw are desirable ingredients for mixing, other high nitrogen plants or combinations of the high nitrogen plants mixed with a high carbon plant or combination of high carbon plants may be used such as corn stalks, soybean stover, sawdust, wood chips and the like. Generally, the plant material must be mixed in proportions to provide a proper high nitrogen-high carbon mixture which will slowly release the nitrogen by microbial action during use. In selecting other plants, plants having a nitrogen content above 1½ percent and preferably above 2 percent by weight are considered high nitrogen plants. These plants are known as high protein plants such as legumes. Plants having less than 1½ percent by weight of nitrogen are high carbon plants.

The proper mixtures may be selected experimentally from known high carbon materials such as wheat straw and sawdust and high nitrogen materials such as alfalfa hay or other legumes. Analysis of experimentally successful plant materials, namely, wheat straw and alfalfa hay have indicated best results with an equal mixture by volume of alfalfa hay and wheat straw but satisfactory results are obtained with mixtures in the ranges of a 3 to 7 mixture by volume of alfalfa hay and wheat straw and a 7 to 3 mixture of the same materials.

When more complex cellulose plants are used, the ratio of high carbon to high nitrogen plants in the mixture may have to be adjusted. High cellulose plants, such as wood chips, require more nitrogen initially from the high nitrogen plant source in the mixture. As decomposition progresses, greater amounts of nitrogen are obtained from microbial action. On the other hand, simpler cellulose plants may require less nitrogen initially and greater nitrogen later.

Although in the preferred embodiment, phosphoric acid is used to adjust the pH of the potting mixture, other acidic substances, such as sulfuric acid, may be used. These substances must be: (1) nontoxic to the plant; (2) have some nutrient value; and (3) remain in the mixture and not be leached out by watering. Sulphur may also be used, however, it has the disadvantage of causing an odor in the potting mixture.

Results equal to or substantially better than peat moss which is the common commercial potting media or bedding material at this time were obtained with mixtures of 7 of 3 of milled alfalfa hay with wheat straw by volume to 3 parts of milled alfalfa hay with 7 parts of milled wheat straw. Pure wheat straw or alfalfa hay resulted in dying or severely damaged plants.

In the preferred embodiment, phosphoric acid between 0.02M and 0.05M is added to the mixture to bring the pH of the mixture within the range of 5.5 and 7.1, the desired range for most plants. Additional amounts of phosphoric acid may be added for acid loving plants. A solution of 85% phosphoric acid is mixed with water to form a 10.2 ml per gallon. This solution is added to the potted plant once a week until the pH of the medium stabilizes between 5.5 and 7.1. Typically, the time period is less than five weeks. After this time, saturation will be reached and no additional phosphoric acid will be needed as long as the plant remains in the same potting media. Phosphoric acid was selected because it is nontoxic, has a nutrient value to the plant and stays in the potting mixture.

Chemical analysis of plants shows good results with ranges of approximately 1 part by weight of nitrogen to 16 parts by weight of carbon up to 1 part by weight of nitrogen to 23 parts by weight of carbon. The exact proportions may differ slightly from mixture to mixture but generally that range provides good results whereas a range between 1 part by weight of nitrogen to 13 parts of weight of carbon or 1 part by weight of nitrogen to 99 parts by weight of carbon result in damage to plants. More moderate mixtues result in plants with some beneficial growth leading up to the best results which are obtainable with approximately 1 part by weight of nitrogen to 17 parts by weight of carbon.

The following examples illustrate the invention:

EXAMPLES

TABLE 1

Performance of *Capsicum frutenscens* L. in potting mixtures containing different proportions of alfalfa hay (MAH) and wheat straw (MWS) as substitutes for peat moss in 1:1:1 peat moss (PM), topsoil (TS) and sand (S) mixture.

| POTTING MIXTURE | RATING | HEIGHT (cm.) | NUMBER OF NODES | DRY WEIGHT (gm) ROOT | SHOOT | LEAF AREA (cm2) |
|---|---|---|---|---|---|---|
| 1 PM:1TS:1S (check) | 8.0 | 12.1 | 9.0 | 1.09 | 1.41 | 50.72 |
| 10 MAH:0 MWS | 3.1 | 3.0 | 3.3 | 0.08 | 0.11 | 10.74 |
| 9 MAH:1 MWS | 2.4 | 2.3 | 3.1 | 0.08 | 0.12 | 13.04 |
| 8 MAH:2 MWS | 3.4 | 4.3 | 4.0 | 0.23 | 0.32 | 30.98 |
| 7 MAH:3 MWS | 6.4 | 9.0 | 5.8 | 0.27 | 0.91 | 83.32 |
| 6 MAH:4 MWS | 9.4 | 14.4 | 9.1 | 1.32 | 2.10 | 101.22 |
| 5 MAH:5 MWS | 9.7 | 15.8 | 9.5 | 1.57 | 2.17 | 89.54 |
| 4 MAH:6 MWS | 9.6 | 16.2 | 9.7 | 1.34 | 1.90 | 85.36 |
| 3 MAH:7 MWS | 7.3 | 12.4 | 9.0 | 0.68 | 0.85 | 51.00 |
| 2 MAH:8 MWS | 2.1 | 3.6 | 2.8 | 0.13 | 0.12 | 9.58 |
| 1 MAH:9 MWS | 1.5 | 2.1 | 2.0 | 0.04 | 0.02 | 2.89 |
| 0 MAH:10 MWS | 1.5 | 2.0 | 2.0 | 0.04 | 0.01 | 3.18 |

TABLE 2

Peformance of *Plectranthus australis* R. in potting mixtures containing different proportions of alfalfa hay (MAH) and wheat straw (MWS) as substitutes for peat moss in a 1:1:1 peat moss (PM), topsoil (TS) and sand (S) mixture.

| POTTING MIXTURES | RATING | HEIGHT (cm.) | NUMBER OF NODES | DRY WEIGHT (gm.) ROOT | SHOOT | LEAF AREA (cm2) |
|---|---|---|---|---|---|---|
| 1 PM:1TS:1 S (check) | 8.1 | 12.6 | 7.0 | 0.96 | 2.66 | 78.96 |
| 10 MAH:0 MWS | 1.8 | 1.9 | 4.0 | 0.12 | 0.15 | 12.56 |
| 9 MAH:1 MWS | 1.9 | 2.2 | 3.8 | 0.15 | 0.18 | 18.24 |
| 8 MAH:2 MWS | 3.8 | 4.0 | 5.0 | 0.25 | 0.33 | 23.62 |
| 7 MAH:3 MWS | 5.6 | 9.6 | 6.7 | 0.67 | 2.55 | 96.96 |
| 6 MAH:4 MWS | 8.5 | 12.2 | 6.6 | 1.32 | 3.42 | 119.44 |
| 5 MAH:5 MWS | 9.7 | 15.3 | 7.7 | 1.21 | 3.54 | 110.72 |
| 4 MAH:6 MWS | 9.1 | 12.7 | 7.0 | 1.19 | 2.76 | 93.40 |
| 3 MAH:7 MWS | 8.1 | 13.1 | 7.0 | 1.11 | 2.60 | 80.92 |
| 2 MAH:8 MWS | 5.0 | 4.3 | 5.5 | 0.42 | 0.93 | 32.40 |
| 1 MAH:9 MWS | 3.2 | 2.1 | 4.7 | 0.26 | 0.47 | 18.20 |
| 0 MAH:10 MWS | 2.7 | 2.7 | 5.0 | 0.24 | 0.47 | 19.18 |

TABLE 3

Performance of *Celosia argentea* var. cristata (1) O. Kuntze in potting mixtures containing different proportions of alfalfa hay (MAH) and wheat straw (MWS) as substitutes for peat moss in a 1:1:1 peat moss (PM), topsoil (TS) and sand (S) mixture.

| POTTING MIXTURES | RATING | HEIGHT (cm.) |
|---|---|---|
| 1 PM:1 TS:1 S (check) | 7.5 | 5.2 |
| 10 MAH:0 MWS | 1.0 | 0.0 |
| 9 MAH:1 MWS | 1.0 | 0.0 |
| 8 MAH:2 MWS | 1.0 | 0.0 |
| 7 MAH:3 MWS | 2.4 | 2.3 |
| 6 MAH:4 MWS | 6.6 | 2.3 |
| 5 MAH:5 MWS | 6.4 | 4.9 |
| 4 MAH:6 MWS | 9.1 | 5.0 |
| 3 MAH:7 MWS | 6.9 | 4.6 |
| 2 MAH:8 MWS | 2.0 | 1.6 |
| 1 MAH:9 MWS | 1.6 | 1.1 |
| 0 MAH:10 MWS | 1.6 | 1.5 |

TABLE 4

Total N and C/N analyses of different formulations of milled alfalfa (AH) and wheat straw (WS).[1]

| Potting Mix | Total N (%) | C/N |
|---|---|---|
| 10 MAH:0 WS | 3.51 | 13:1 |
| 9 AH:1 WS | 3.35 | 13:1 |
| 8 AH:2 WS | 3.21 | 14:1 |
| 7 AH:3 WS | 2.86 | 16:1 |
| 6 AH:4 WS | 2.85 | 16:1 |
| 5 AH:5 WS | 2.59 | 17:1 |
| 4 AH:6 WS | 2.24 | 20:1 |
| 3 AH:7 WS | 1.98 | 23:1 |
| 2 AH:8 WS | 1.48 | 30:1 |
| 1 AH:9 WS | 0.80 | 44:1 |
| 0 AH:10 WS | 0.44 | 99:1 |

[1] All data based on the average of 4 experimental samples.

The effect of pH adjustment is shown by similar examples on which mixtures were studied to determine pH changes with time. The mixes were of peat moss (PM), perlite (P), vermiculite (V) and clay loam soil (CLS) with Poinsetta plants growing in the media in six-inch pots. The results are shown in tables 5 and 6. The pH readings were measured two days after 250 ml of 0.04 molar (M) $H_3PO_4$ was applied to the media. In tables 5 and 6 the combination of 1P:½V:½CLS is indicated as standard mix (SM).

TABLE 5

EFFECT OF PHOSPHORIC ACID OF THE pH LEVELS OF SEVERAL POTTING MIXTURES

| POTTING MIXES | DATES | | | |
|---|---|---|---|---|
| | 10-6-83 | 10-13-83 | 10-20-83 | 10-27-83 |
| | Check (non-acidified) | | | |
| 1 PS:1 SM | 6.9 | 7.0 | 6.6 | 6.8 |
| 7 AH:3 WS:15 M | 7.8 | 7.3 | 7.2 | 7.1 |
| 6 AH:4 WS:15 M | 7.6 | 7.5 | 7.1 | 7.0 |
| 5 AH:5 WS:15 M | 7.5 | 7.4 | 7.1 | 7.2 |

TABLE 5-continued

EFFECT OF PHOSPHORIC ACID OF THE pH
LEVELS OF SEVERAL POTTING MIXTURES

| POTTING | DATES | | | |
|---|---|---|---|---|
| MIXES | 10-6-83 | 10-13-83 | 10-20-83 | 10-27-83 |
| Acidified with 0.04 molar H₃PO₄ | | | | |
| 1 PM:15 M | 5.8 | 5.7 | 5.6 | 4.9 |
| 7 AH:3 WS:15 M | 6.3 | 6.7 | 6.3 | 5.7 |
| 6 AH:4 WS:15 M | 6.4 | 6.7 | 6.3 | 5.4 |
| 5 AH:5 WS:15 M | 6.1 | 6.6 | 6.4 | 5.7 |

TABLE 6

EFFECT OF PHOSPHORIC ACID OF THE pH
LEVELS OF SEVERAL POTTING MIXTURES

| POTTING | DATES | | | | |
|---|---|---|---|---|---|
| MIXES | 11-3-83 | 11-10-83 | 11-17-83 | 11-24-83 | 12-1-83 |
| Check (non-acidified) | | | | | |
| 1 PS:1 SM | 6.9 | 7.1 | 7.1 | 7.1 | 7.2 |
| 7 AH:3 WS:15 M | 7.2 | 7.6 | 7.5 | 7.3 | 7.5 |
| 6 AH:4 WS:15 M | 7.5 | 7.5 | 7.9 | 7.2 | 7.4 |
| 5 AH:5 WS:15 M | 7.3 | 7.6 | 8.1 | 7.6 | 7.5 |
| Acidified with 0.04 molar H₃PO₄ | | | | | |
| 1 PM:15 M | 4.4 | 5.3 | 6.1 | 6.3 | 5.8 |
| 7 AH:3 WS:15 M | 4.8 | 5.5 | 5.5 | 5.8 | 6.0 |
| 6 AH:4 WS:15 M | 4.7 | 5.6 | 6.1 | 5.9 | 6.1 |
| 5 AH:5 WS:15 M | 4.7 | 5.6 | 6.2 | 6.1 | 5.9 |

From the above description, it can be understood that the potting media of this invention has several advantages, such as: (1) it is inexpensive; (2) the materials for it are renewable, readily available resources; and (3) it provides superior results for long periods of time.

While a preferred embodiment of the invention has been described with some particularity, many modifications and variations may be made in the preferred embodiment without deviating from the invention. Accordingly, it is to be understood that, within the scope of the appended claims, the invention may be practiced other than as specifically described.

What is claimed is:

1. A growing medium comprising:
   pulverized alfalfa hay;
   pulverized wheat straw; and
   said alfalfa hay and wheat straw being mixed together in substantially equal volumes wherein a mixture having a ratio of carbon-to-nitrogen of substantially seventeen to one by weight is formed.

2. A growing medium in accordance with claim 1 further including topsoil.

3. A growing medium in accordance with claim 1 further including sand.

4. A growing medium in accordance with claim 1 further including perlite.

5. A growing medium in accordance with claim 1 further including vermiculite.

6. A growing medium according to claim 1 in which the mixture is a compost, whereby anaerobic creation of unpleasant odors is avoided.

7. A growing medium comprising:
   pulverized alfalfa hay;
   pulverized wheat straw;
   said alfalfa hay and wheat straw being mixed together in the range of proportions of seven volumes of alfalfa hay to three volumes of wheat straw and three volumes of alfalfa hay to seven volumes of wheat straw wherein a mixture is formed having a ratio of nitrogen-to-carbon substantially in the range of one part by weight of nitrogen to sixteen parts by weight of carbon and one part by weight of nitrogen to twenty-three parts by weight of carbon; and
   said growing medium including an acid mixed in sufficient proportion to reduce the pH of the mixture to a range of between 5.5 and 7.1.

8. A growing medium in accordance with claim 7 further including topsoil.

9. A growing medium in accordance with claim 7 further including sand.

10. A growing medium in accordance with claim 7 further including perlite.

11. A growing medium in accordance with claim 7 further including vermiculite.

* * * * *